(12) United States Patent
Garcia et al.

(10) Patent No.: US 8,002,227 B2
(45) Date of Patent: Aug. 23, 2011

(54) PIVOT AND TILT APPARATUS

(76) Inventors: Joseph Garcia, San Antonio, TX (US); David Gutting, Sonoma, CA (US)

( * ) Notice: Subject to any disclaimer, the term of this patent is extended or adjusted under 35 U.S.C. 154(b) by 454 days.

(21) Appl. No.: 12/179,738

(22) Filed: Jul. 25, 2008

(65) Prior Publication Data
US 2009/0126157 A1   May 21, 2009

Related U.S. Application Data

(60) Provisional application No. 60/952,480, filed on Jul. 27, 2007.

(51) Int. Cl.
*E04G 3/00* (2006.01)
(52) U.S. Cl. .......... 248/278.1; 16/367; 362/275
(58) Field of Classification Search .......... 16/367, 16/366, 302, 319, 337, 350, 351, 374, 375, 16/348; 403/55, 53, 161; 248/276.1, 274.1, 248/282.1, 284.1, 278.1; 362/275
See application file for complete search history.

(56) References Cited

U.S. PATENT DOCUMENTS

| | | | | |
|---|---|---|---|---|
| 1,680,560 A | * | 8/1928 | McDonald | 403/55 |
| 5,140,507 A | * | 8/1992 | Harwood | 362/271 |
| 6,249,426 B1 | * | 6/2001 | O'Neal et al. | 361/679.27 |
| 6,297,946 B2 | * | 10/2001 | O'Neal et al. | 361/679.27 |
| 6,304,433 B2 | * | 10/2001 | O'Neal et al. | 361/679.27 |
| 6,505,988 B1 | * | 1/2003 | Oddsen, Jr. | 403/110 |
| 6,594,860 B2 | * | 7/2003 | Czipri | 16/367 |
| 6,739,559 B2 | * | 5/2004 | Nakatani | 248/187.1 |
| 6,907,642 B1 | * | 6/2005 | Czipri | 16/367 |
| 7,007,906 B2 | * | 3/2006 | Slatter | 248/276.1 |
| 7,155,781 B2 | * | 1/2007 | Yamada et al. | 16/367 |
| 2002/0129465 A1 | * | 9/2002 | Czipri | 16/367 |
| 2004/0200038 A1 | * | 10/2004 | Kim | 16/367 |

* cited by examiner

*Primary Examiner* — Victor Batson
*Assistant Examiner* — Jeffrey O'Brien

(57) ABSTRACT

A pivot and tilt apparatus for positioning a member comprises a first pivot assembly having a first pivot post at a first end thereof rotatable about a first axis for engaging the member and an annulus at a second end thereof and a second pivot assembly having a second pivot post rotatable about a second axis for engaging the annulus of said first pivot.

7 Claims, 9 Drawing Sheets

US 8,002,227 B2

PIVOT AND TILT APPARATUS

CROSS-REFERENCE TO RELATED APPLICATIONS

The instant application claims the benefit of co-pending U.S. Provisional Application Ser. No. 60/952,480 filed Jul. 27, 2007 and entitled "Pivot and Tilt Apparatus".

BACKGROUND OF THE INVENTION

Field of the Invention

The present invention relates generally to a system for positioning a member about two axes or rotation and specifically to an apparatus that provides the ability to rotate a member, for example a light assembly, around two axes and further provides a single, easily operated locking mechanism so that the light assembly may be readily adjusted.

SUMMARY OF THE INVENTION

The present invention provides an apparatus for precise adjustment of a mounted member around two axes. The invention is particularly well-suited for use in adjusting track head luminaries to achieve precise positioning for desired lighting effects. In many lighting applications, it is desirable to carefully and accurately position track lights to illuminate work areas, art exhibits, pictures, seating areas and the like. Accordingly, it is necessary to position the lights in some fashion that enables the light to stay in place once released.

The instant invention provides an apparatus for positioning a track light or any other item that can be mounted that enables a user to adjust the positioning with one hand and lock in the desired position with a single locking knob. The invention comprises a vertical and horizontal pivot assembly, both of which are locked and unlocked by the rotation of a single locking knob.

A vertical pivot assembly is provided around which a mounted member may rotate in a vertical plane. Additionally, a horizontal pivot assembly is provided that is engaged by the vertical pivot mechanism and permits motion of a mounted member in a horizontal plane. A locking knob engages both the vertical and horizontal pivot assemblies to permit and prevent motion around their respective axes.

Additionally, in one embodiment of the invention, a rotation inhibiting system incorporating a plurality of O-rings is provided to assist a user in maintaining the member position around a vertical axis for easy adjustment.

Other features, advantages and objects of the present invention will become apparent from the detailed description of the preferred embodiment(s) provided herein below, when taken in conjunction with the appended drawing Figures, wherein:

BRIEF DESCRIPTION OF THE DRAWING FIGURES

DETAILED DESCRIPTION OF THE PREFERRED EMBODIMENT(S)

Figure 1:
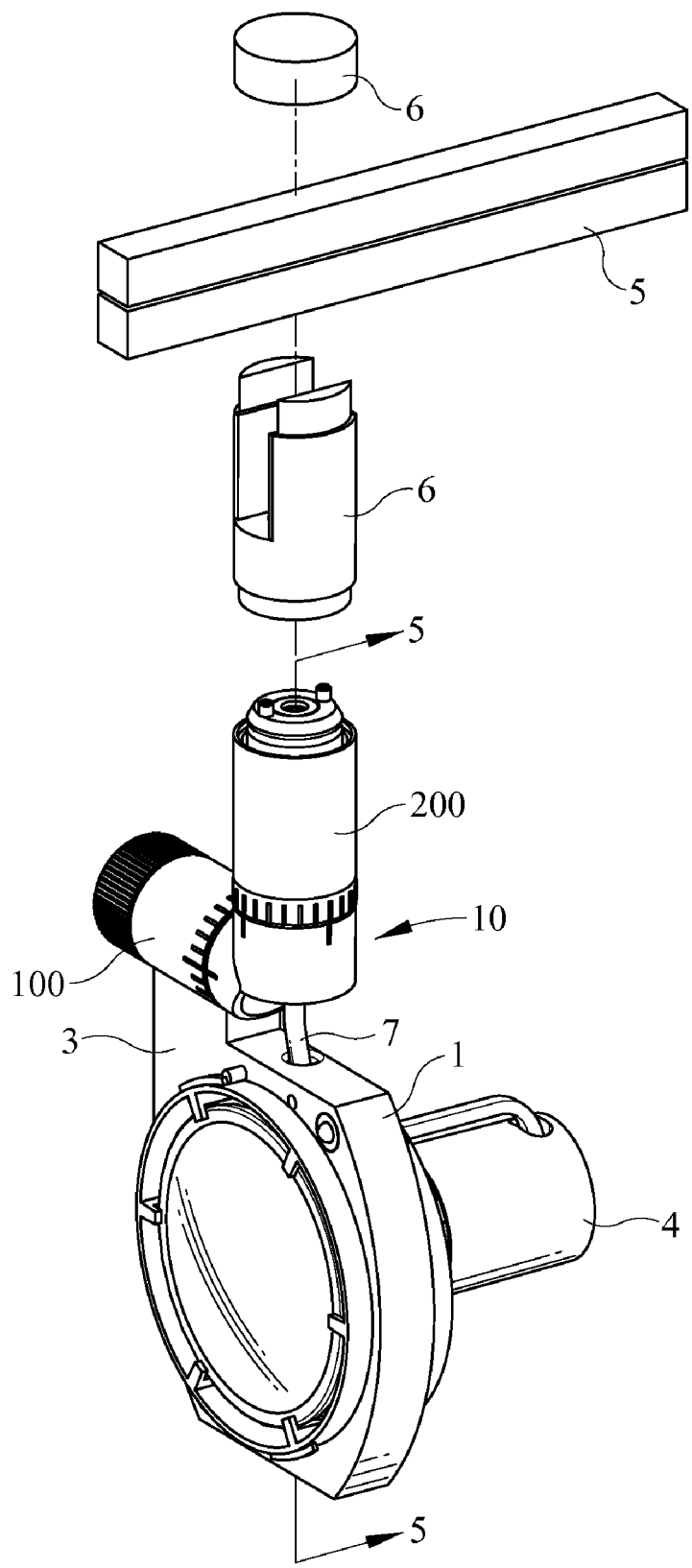
FIG. 1 is an isometric view of a pivot and tilt apparatus in conjunction with a track lighting system in accordance with one embodiment of the present invention.
Figure 2:
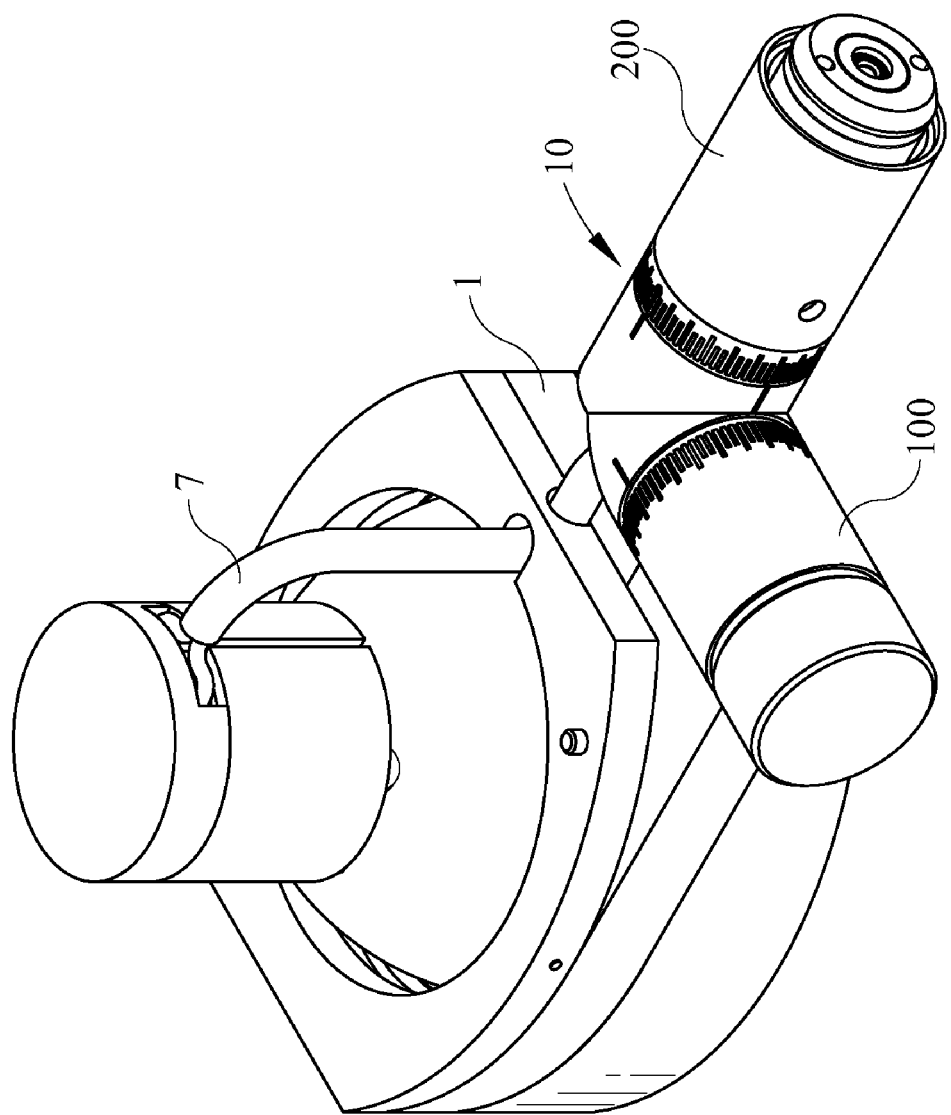
FIG. 2 is an isometric view of a pivot and tilt apparatus in accordance with one embodiment of the present invention.

Referring now to drawing FIGS. 1 and 2, and in accordance with a one embodiment of the present invention, an apparatus 10 for effecting rotation of a member 1 about two axes includes a vertical pivot assembly 100 and a horizontal pivot assembly 200. Vertical pivot assembly 100 permits rotation of member 1 about a first or vertical axis, while horizontal pivot assembly 200 permits rotation of member 1 about a second or horizontal axis.

It is to be understood that for purposes of explication herein below the first axis and vertical axis are referred to synonymously, while the second axis and horizontal axis are also identical. However, the choice of vertical and horizontal axes is not meant to be limiting of the present invention, since any two orientations may be chosen for first and second axes without departing from the scope thereof. In the context of drawing Figures of the present invention, it is contemplated that yoke 3 is provided to mount a lighting fixture 4 and concomitant lamp to a lighting track 5 utilizing a track connector 6. However, the invention will provide an apparatus 10 for precisely positioning a member 1 regardless of the function of member 1.

Referring now to drawing FIGS. 2-5 and in accordance with one embodiment of the invention, vertical pivot assembly 100 includes a first pivot post 110 that is sized to engage an aperture 2 extending through yoke 3 that provides a means for mounting member 1. First pivot post 110 is a generally cylindrical vertical post 110 having a first end 112 that may include a plurality of conventional male helical threads 114 around an end portion thereof. A second end 116 of vertical pivot post 110 terminates in vertical pivot body 140. Vertical pivot post 110 is rotatable with respect to yoke 3 aperture 2 about a first axis of rotation that extends in a longitudinal direction through vertical pivot post 110.

Figure 3:
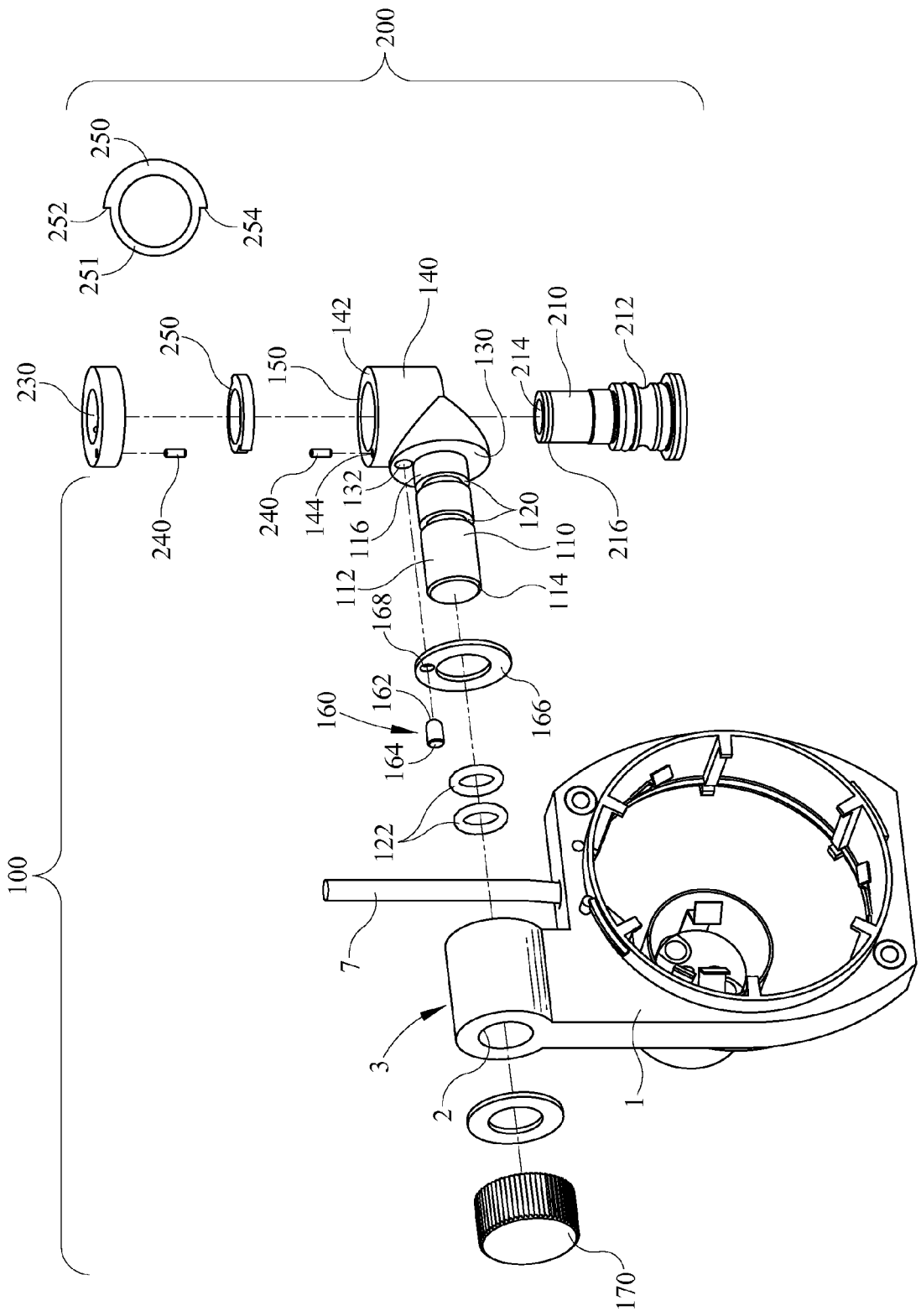
FIG. 3 is an exploded isometric view of a pivot and tilt apparatus in accordance with one embodiment of the present invention.
Figure 4:
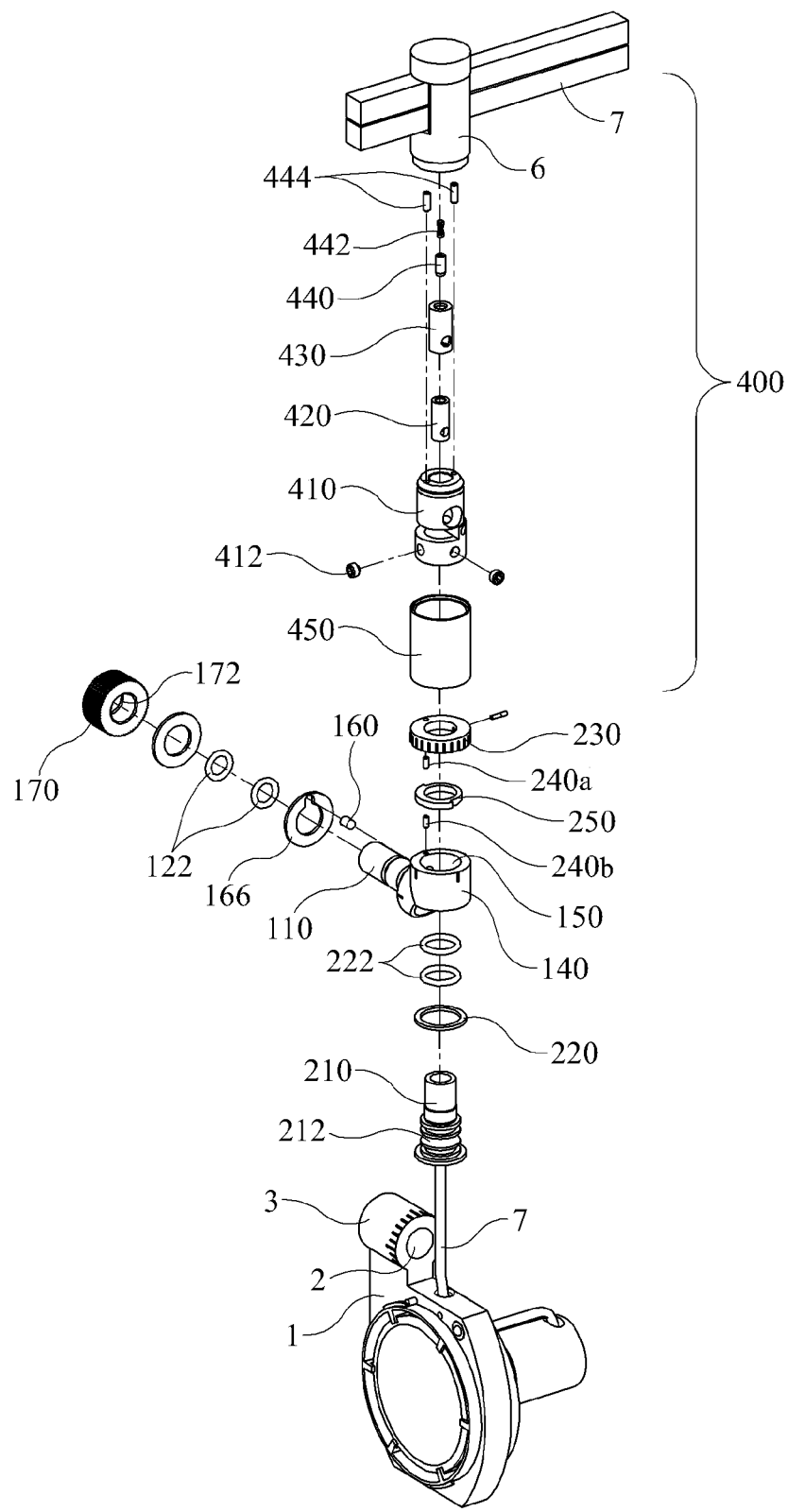
FIG. 4 is an exploded isometric view of a pivot and tilt apparatus in a track lighting environment in accordance with one embodiment of the present invention.
Figure 5:
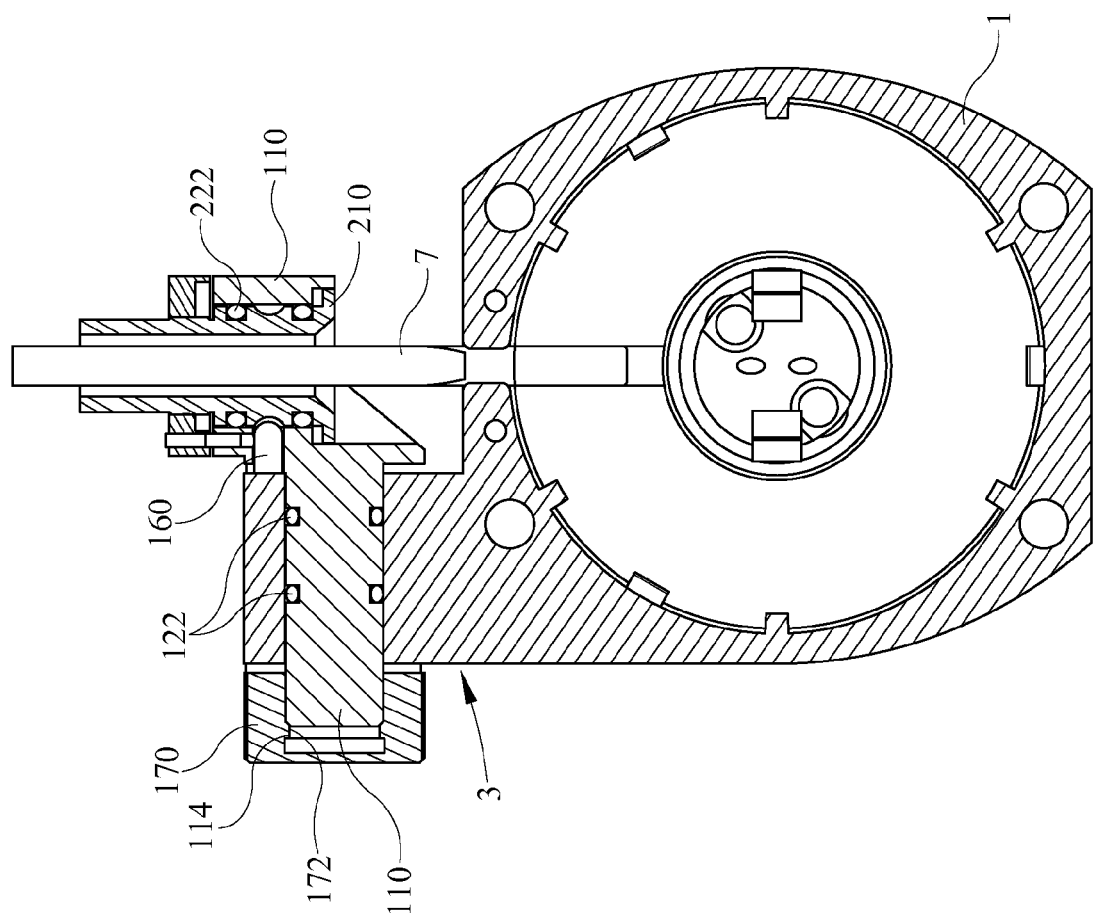
FIG. 5 is a cross-sectional view of a pivot and tilt apparatus taken along the line 5-5 of FIG. 1 in accordance with one embodiment of the present invention.

Additionally, in one embodiment of the present invention, vertical pivot post 110 may further comprise a circumferential groove 120, or a plurality thereof as seen in FIGS. 3-5, capable of accepting a plurality of o-rings 122. O-rings 122 are provided to contact an interior surface of aperture 2 to inhibit the rotation of vertical pivot post 110 with respect to yoke 3 when the pivot assembly 100 is not locked, as will be discussed further below.

Referring again to FIGS. 3-5, pivot body 140 comprises an annular flange 130 having an aperture 132 therethrough. Vertical pivot body 140 further includes an annulus 150 extending therethrough, shaped to accept a complementary portion of horizontal pivot assembly 200. Annulus 150 extends through vertical pivot body 140 along a horizontal or second axis. Aperture 132 extends through annular flange 130 to define a passage that communicates with annulus 150. Vertical pivot body 140 also comprises an upper flange surface 142 having an index locking pin aperture 144 therein in which an index locking pin 240 may be positioned.

Vertical pivot assembly 100 further comprises a locking pin 160 having a first end 162 extending through aperture 132, through annular flange 130 and into annulus 150. An alignment washer 166 may be provided to be positioned over vertical pivot post 110 and abut with flange 130. Alignment washer 166 may include an aperture 168 (or alternatively a slot) therein which aligns with aperture 132 on flange 130, and through which locking pin 160 is inserted. Locking pin 160 also has a second end 164 that abuts yoke 3 when apparatus 10 is fully assembled.

A locking knob 170 having a plurality of female threads 172 on an interior portion thereof is also provided to engage male threads 114 of vertical pivot post 110. Apparatus 10 is secured to member 1 by inserting vertical pivot post 110 through aperture 2 of yoke 3, then threading locking knob 170 onto vertical pivot post 110.

Horizontal pivot assembly 200 comprises a generally cylindrical horizontal (or second) pivot post 210 that is sized to be received in annulus 150 of vertical pivot body 140. Horizontal post 210 includes a section thereof having a circumferential groove 212 extending around the entire circumference of pivot post 210 that is engaged by locking pin 160 once it is inserted through aperture 132 and extends into annulus 150. Pivot body 140 is rotatable around horizontal pivot post 210 in annulus 150 as long as locking pin 132 isn't securely engaging groove 212. Horizontal pivot post 210 may further comprise a plurality of male helical threads 216 on its terminal end.

Additionally, in one embodiment of the invention wherein a lighting fixture is being mounted, horizontal pivot post 210 may be generally tubular such that a cylindrical passage 214 is provided through which electrical wiring 7 may be routed for connection to lighting track 5.

As best seen in FIG. 4, horizontal pivot assembly 200 may further include a washer 220, and an o-ring 222, or a plurality thereof, sized to engage an outer surface of horizontal pivot post 210 and an inner surface of annulus 150 when pivot post 210 is inserted therein. This feature of the present invention inhibits horizontal rotation of member 1 through the frictional force exerted on the inner surface of annulus 150 and the outer surface of horizontal pivot post 210 by O-rings 222, absent some exterior force supplied to yoke 3, which enables member 1 to be positioned easily and maintain that position prior to it being locked into place.

As best seen in FIGS. 3, 4 and 9-11 horizontal pivot assembly 200 may further comprise an index ring 230 having a plurality of female threads 232 at an inner annular surface thereof for engaging the male threads of horizontal pivot post 210 and securing horizontal pivot post 210 to vertical pivot body 140. Index ring 230 may also include an aperture 234, best seen in FIG. 9, for accepting a first index lock pin 240a. Index lock pin 240a protrudes from aperture 234 and engages an index lock ring 250 at a pair of lock stops 252, 254 which come into contact with first lock pin 240a as horizontal pivot post 210, and thus index ring 230 rotates. Index lock ring 250 comprises an annular ring having a semi-circular truncated section 251 terminating in lock stops 252, 254. In one embodiment of the invention, truncated section 251 extends 180 degrees around index lock ring 250.

A second index locking pin 240b is inserted in the index locking pin aperture 144 of vertical pivot body 140, which also engages lock stop 252 of index lock ring 250. When assembled, horizontal pivot post 210 is inserted through annulus 150, then index lock ring 250 is placed over horizontal pivot post 210 such that one lock stop 254 contacts second index locking pin 240b extending from aperture 144 of vertical pivot body 140. Next, index ring 230 is placed over horizontal pivot post 210 and tightened in place via helical threads 232 engaging complementary threads 216. Once positioned, index ring 230 includes first locking pin 240a protruding from aperture 234, which engages one lock stop 252 of index lock ring 250.

It should be noted that first and second index locking pins 240a, 240b do not extend far enough in a longitudinal direction to contact each other as horizontal pivot post 210 and index ring 230 rotate. In this fashion, horizontal pivot body 140 is free to rotate from a point where locking pin 240a contacts a first lock stop 252, through 180 degrees of rotation around truncated portion 251 of index lock ring 250 until it abuts second lock stop 254, whereupon the entire index lock ring 250 is rotated with horizontal pivot body 140 through another 180 degrees until first lock stop 252 is forced into contact with locking pin 240b extending from pivot body 140.

Accordingly, the arrangement and interaction of index ring 230, index lock ring 250, and locking pins 240a, 240b permits pivot body 140 to travel through 360 degrees of rotation around horizontal pivot post 210 for precise positioning, but no more than 360 degrees. This feature of the present invention is useful for lighting applications, where it is desirable to permit rotation of a lamp or the like, but highly undesirable to permit too much rotation due to the stress placed on electrical conductors subject to this rotation. Additionally, by changing the distance or length of truncated portion 251 around the circumference of index lock ring 250, the degree of rotation of pivot body 140 around horizontal pivot post 210 can be customized.

When assembled, vertical pivot post 110 and horizontal pivot post 210 are positioned as desired for placement of member 1, whereupon locking knob 170 may be tightened, thereby tightly engaging vertical pivot post 110 and forcing locking pin 160 against yoke 3 and into aperture 132. In turn, locking pin 160 presses against groove 212 of horizontal pivot post 210, thereby preventing rotation of either vertical pivot post 110 or pivot body 140 around horizontal pivot post 210. When adjustment of member 1 is required, locking knob 170 is simply loosened, thereby lessening the frictional force against vertical pivot post 110 and permitting locking pin 160 to disengage from groove 212 to enable rotation of horizontal pivot post 210.

As best seen in FIG. 4 a jack assembly 400 permits the invention to be practiced in conjunction with modern track lighting systems. Jack assembly 400 includes a generally annular jack contact 410 for accepting and terminating one electrical wire, a pin wire coupler 420 to which a second power wire is terminated and a pin isolator 430 to provide electrical isolation between wire coupler 420 and jack contact 410. Jack assembly 400 may further comprise a connector housing 440, a connector spring 442, and a pair of registration pins 444 to enable positive positioning with track connector 6. Jack assembly 400 is completed by a cover 450, enclosing all jack assembly 400 components.

In operation, wiring 7 is routed through horizontal pivot post 210 and terminated in jack contact 410 and wire coupler 420 that nests inside jack contact 410. The jack contact 410 is secured to horizontal pivot post 210 via a plurality of set screws 412 whereupon cover 450 is secured over the entire assembly and it engages track connector 6.

Figure 7:
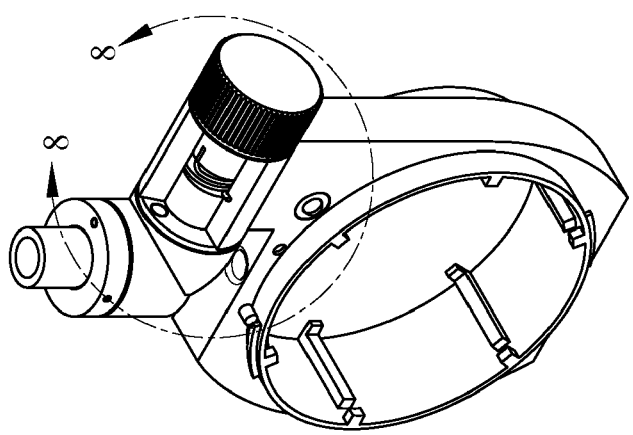
FIG. 7 is an isometric view of a pivot and tilt apparatus in accordance with one embodiment of the present invention.
Figure 8:
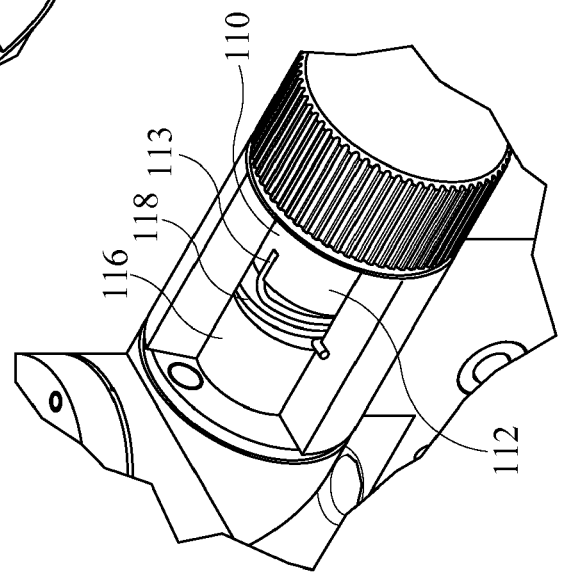
FIG. 8 is a detailed view of a pivot and tilt apparatus taken along the area 8 of FIG. 7 in accordance with one embodiment of the present invention.
Figure 6:
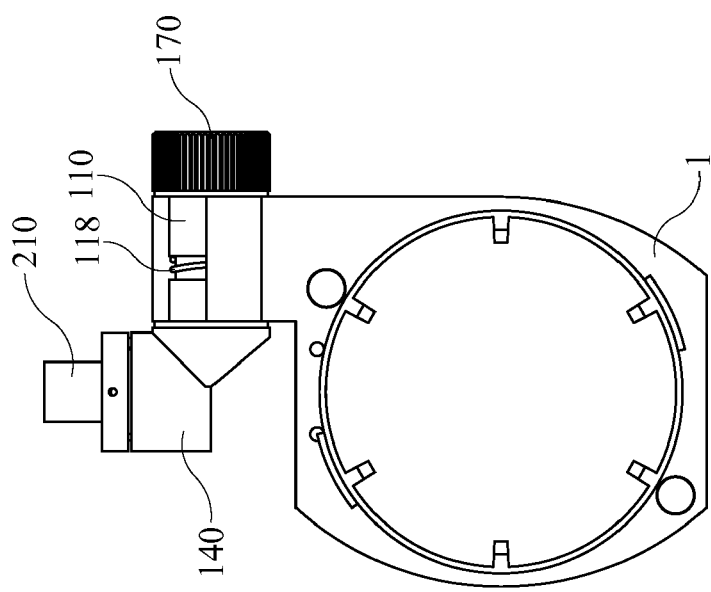
FIG. 6 is a front view of a pivot and tilt apparatus in accordance with one embodiment of the present invention.
Figure 9:
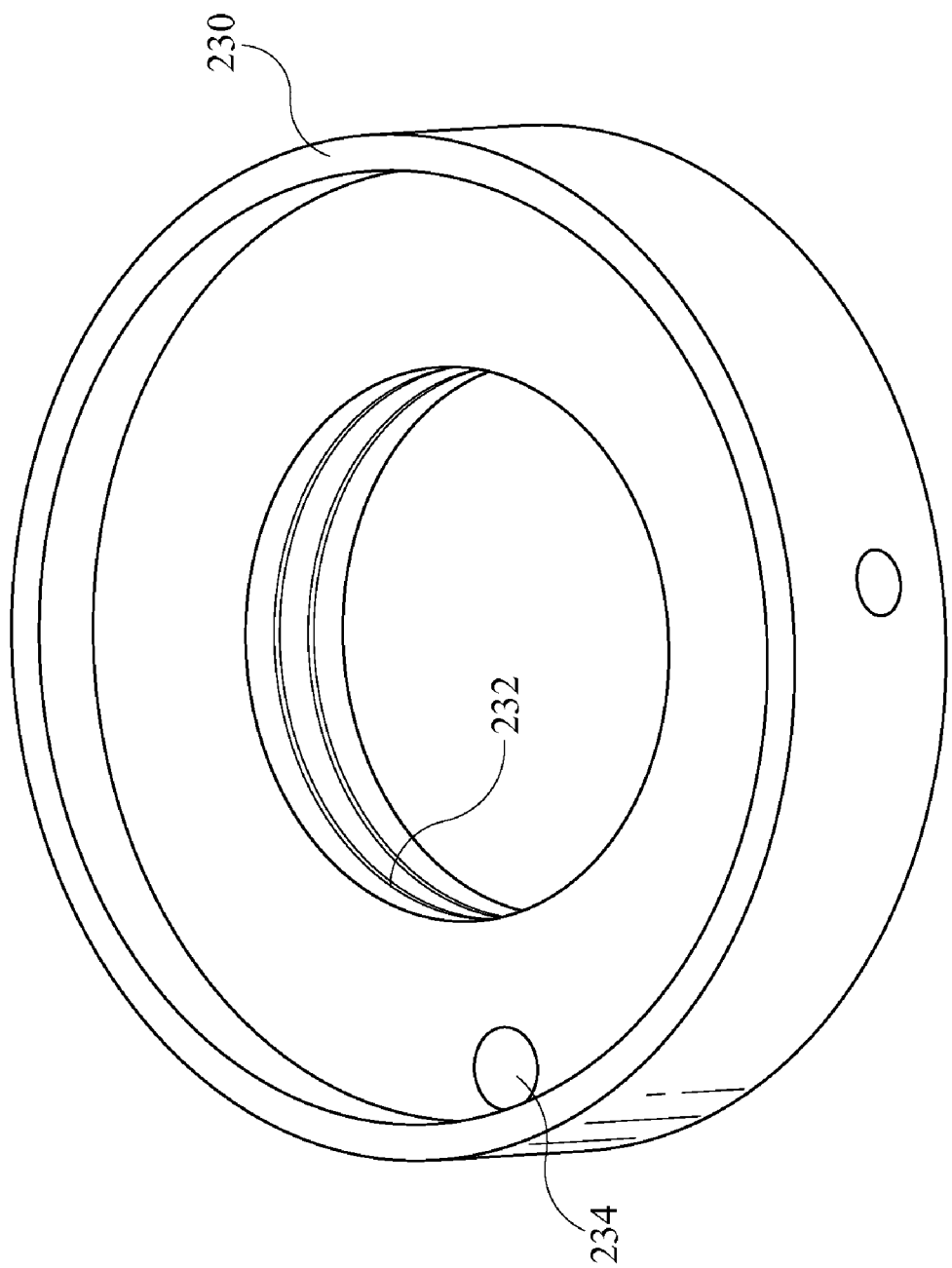
FIG. 9 is an isometric view of an index ring in accordance with one embodiment of the present invention.
Figure 10:
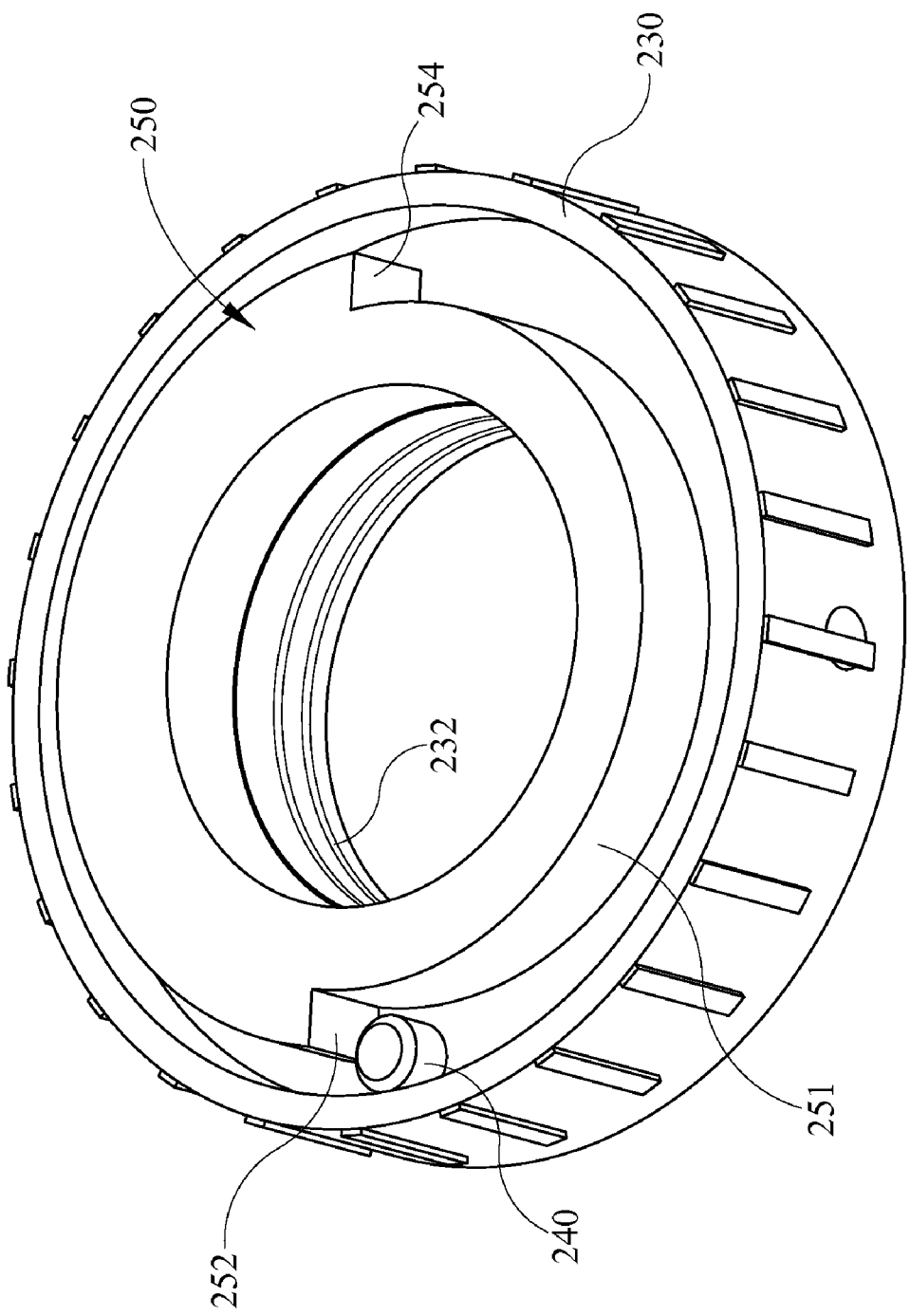
FIG. 10 is an isometric view of an index ring and an index lock ring in accordance with one embodiment of the present invention.
Figure 11:
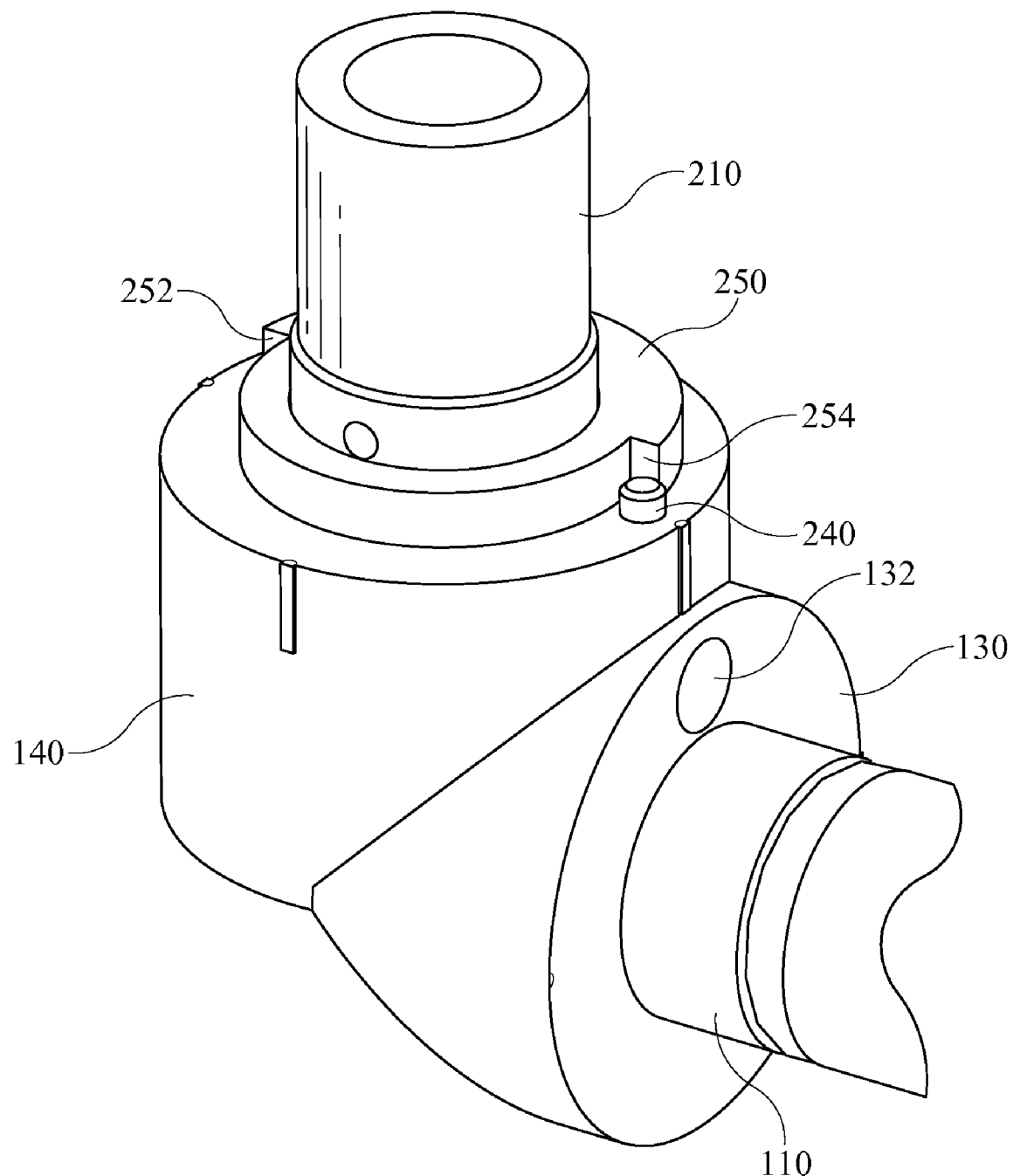
FIG. 11 is an isometric view of a vertical pivot body and horizontal pivot assembly in accordance with one embodiment of the present invention.

Referring now to FIGS. 6-8, and in accordance with a further embodiment of the present invention, vertical pivot assembly 100 may comprise a torsion spring 118 to provide a constant rotational force to pivot post 110. In this embodiment of the invention, vertical pivot post 110 may comprise a two piece construction wherein first end 112 is separated from second end 116 by torsion spring 118. A slot 113 may be provided in first and second ends 112 or 116 respectively, for capturing each end of torsion spring 118 and thereby imparting a rotational force to pivot post 110 relative to yoke 3. This embodiment of the invention aids in positioning member 1.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

We claim:

1. A lighting fixture having a pivot and tilt apparatus for positioning said lighting fixture around vertical and horizontal axes comprising:
    a lighting fixture having a yoke with a central aperture;
    a vertical pivot body having a central annulus surrounded by an upper flange surface and also having an outwardly extending vertical pivot post, said vertical pivot body further having a lower flange surrounding a first end of said vertical pivot post;
    wherein said annulus has an annulus central axis which is substantially perpendicular to a central axis defined by said vertical pivot body;
    a horizontal pivot post extending through said central annulus of said vertical pivot body and having a circumferential groove;
    an index ring threadably engaging an end of said horizontal pivot post and said upper flange surface of said vertical pivot body;
    an index lock ring interposed between said index ring and said vertical pivot body;
    a locking knob threadably engaging a second end of said vertical pivot post extending through said yoke thereby tightening said yoke against said lower flange of said vertical pivot body which substantially surrounds said first end of said vertical pivot post thereby preventing rotation of said yoke about said vertical pivot post;
    a locking pin abutting against a surface of said yoke and through an aperture in an alignment washer and also through an aperture of said lower flange and into said central annulus of said vertical pivot body;
    whereby tightening said locking knob causes said locking pin to engage said circumferential groove of said horizontal pivot post thereby preventing rotation of said vertical pivot body about said horizontal pivot post.

2. The fixture and apparatus of claim 1 wherein said index lock ring has a first and a second lock stop along a periphery, said periphery of said index lock ring also having a truncated portion.

3. The fixture and apparatus of claim 2 further comprising a second locking pin, said second locking pin extending from said index ring abutting said truncated portion of said index lock ring allowing restricted rotation of said vertical pivot body.

4. The fixture and apparatus of claim 3 further comprising a third locking pin extending upwards from said vertical pivot body and abutting said truncated portion of said index lock ring; wherein said truncated portion of said index lock ring extends along about said periphery, wherein said second and said third locking pin combine to restrict rotation of said vertical pivot body to about 360 degrees by travel of said second and third locking pin about said truncated portion.

5. The fixture and apparatus of claim 4 wherein said truncated portion of said index lock ring extends along about 180 degrees of said periphery of said index lock ring.

6. The fixture and apparatus of claim 1 wherein said lighting fixture has an electrical wire extending from said fixture and through said annulus of said pivot body and said horizontal pivot post.

7. A lighting fixture having a pivot and tilt apparatus for positioning said lighting fixture around vertical and horizontal axes comprising:
    a lighting fixture having a yoke with a central aperture;
    a vertical pivot body having a central annulus surrounded by an upper flange surface and also having an outwardly extending vertical pivot post, said vertical pivot body further having a lower flange surrounding a first end of said vertical pivot post;
    wherein said annulus has an annulus central axis which is substantially perpendicular to a central axis defined by said vertical pivot body;
    a horizontal pivot post extending through said central annulus of said vertical pivot body and having a circumferential groove;
    an index ring threadably engaging an end of said horizontal pivot post and said upper flange surface of said vertical pivot body;
    an index lock ring interposed between said index ring and said vertical pivot body;
    a locking knob threadably engaging a second end of said vertical pivot post extending through said yoke thereby tightening said yoke against said lower flange of said vertical pivot body which substantially surrounds said first end of said vertical pivot post thereby preventing rotation of said yoke about said vertical pivot post;
    a first locking pin abutting against a surface of said yoke and through an aperture in an alignment washer and also through an aperture of said lower flange and into said central annulus of said vertical pivot body;
    whereby tightening said locking knob causes said first locking pin to engage said circumferential groove of said horizontal pivot post thereby preventing rotation of said vertical pivot body about said horizontal pivot post;
    wherein said lighting fixture has an electrical wire extending from said fixture and through said annulus of said pivot body and said horizontal pivot post to an electrical source;
    a second locking pin extending from said index ring abutting said truncated portion of said index lock ring thereby restricting rotation of said vertical pivot body about said horizontal pivot post and including a third locking pin extending upwards from said vertical pivot body and abutting said truncated portion of said index lock ring, said truncated portion of said index lock ring extending along about 180 degrees of said periphery, said second and said third locking pin combining to restrict rotation of said vertical pivot body to about 360 degrees.

* * * * *